Patented Nov. 7, 1922.

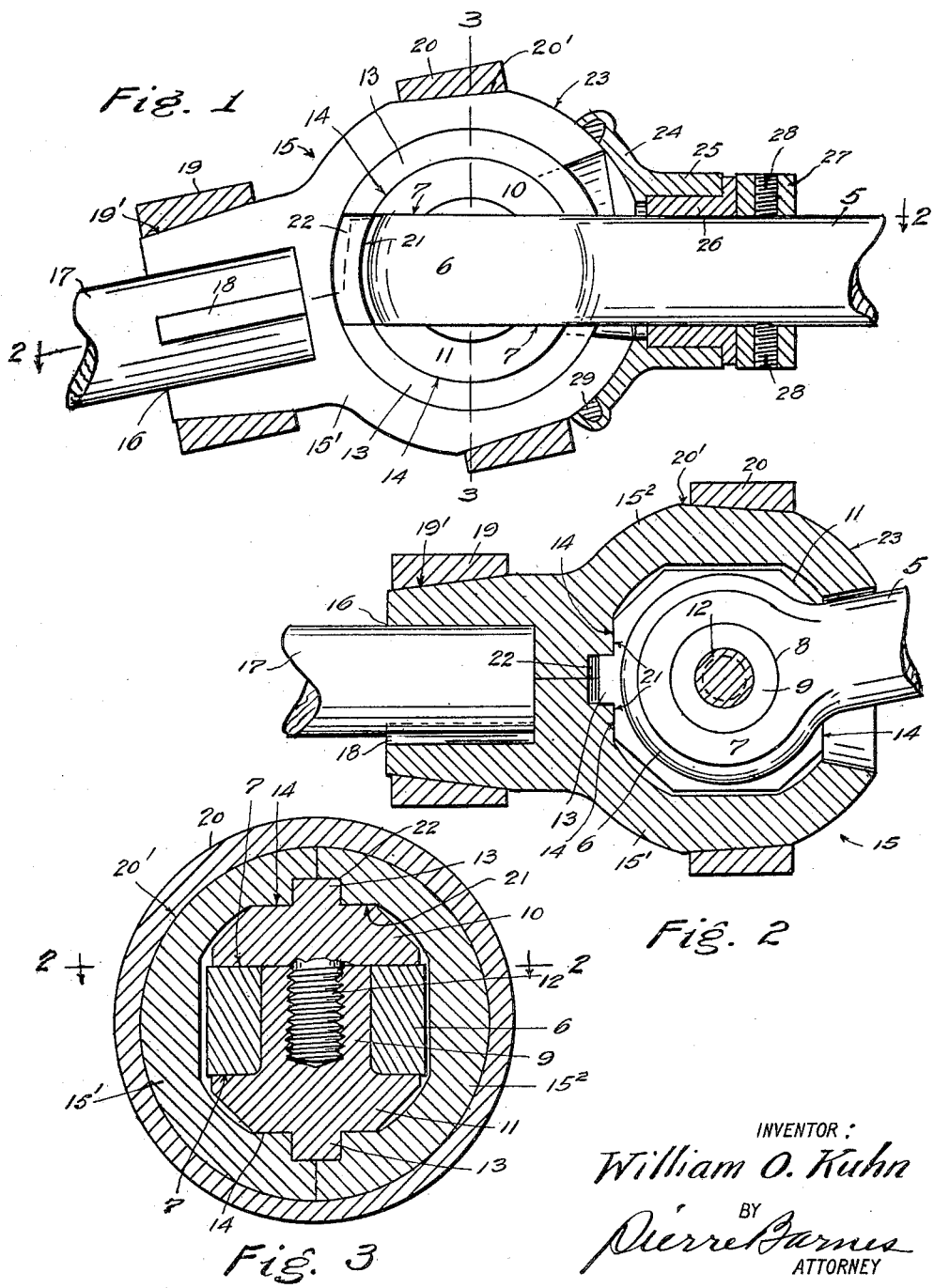

1,434,443

UNITED STATES PATENT OFFICE.

WILLIAM O. KUHN, OF ALDERWOOD MANOR, WASHINGTON, ASSIGNOR OF ONE-HALF TO WILSON R. GAY, OF SEATTLE, WASHINGTON.

UNIVERSAL JOINT.

Application filed August 16, 1917, Serial No. 186,447. Renewed May 25, 1922. Serial No. 563,672.

*To all whom it may concern:*

Be it known that I, WILLIAM O. KUHN, a citizen of the United States, residing at Alderwood Manor, in the county of Snohomish and State of Washington, have invented certain new and useful Improvements in Universal Joints, of which the following is a specification.

This invention relates to improvements in universal joints including parts which serve as a casing for excluding dirt and preventing the escape of lubricants from the joint proper.

The object of the invention is the perfecting of devices of this character to render the same more simple, durable and efficient.

The invention consists in the novel construction, adaptation and combination of parts, as will be hereinafter described and claimed.

In the accompanying drawings, Figure 1 is a view partly in longitudinal section and partly in elevation of a shaft coupling embodying my invention and illustrated with one of the casing members omitted. Fig. 2 is a longitudinal sectional view through 2—2 of Figs. 1 and 3, and omitting parts shown in Fig. 1. Fig. 3 is a transverse section through 3—3 of Fig. 1.

The reference numeral 5 designates a shaft having an enlarged extremity 6 provided with parallel plane surfaces 7 and bored, as at 8, Fig. 2, to receive a post element 9 of the yoke member of the joint. Said yoke is formed with two spaced heads 10 and 11, the former, 10, being, as shown, provided with a screw stud 12 engaging in a threaded hole of the post 9 which is integral with the other head 11.

The opposing faces of said heads are machined to fit against the aforesaid faces 7 of the shaft 5. Projecting from concentrically disposed surfaces 14 of the yoke heads are arcuate ribs 13 of rectangular shapes, preferably, in cross section, and arranged to have their medial planes extend through the axis of the post 9.

Enclosing said yoke member and constituting the other member of my improved joint is a casing, indicated generally by 15, of a substantially globular shape at one end and at its other end is provided with a socket 16 for a shaft 17 to which the casing is secured by means of a key or spline 18 against independent rotary movements. The casing member 15 is formed of two complementary parts $15^1$—$15^2$ divided at a plane extending through the axis of the shaft 17.

19 and 20 represent rings fitting on tapering seats $19^1$ and $20^1$ of the casing to secure the parts thereof together. The casing chamber provided for the yoke is formed with a circular wall 21 to serve as a bearing with respect to the yoke surfaces 14 and is furthermore provided with a peripheral way 22 formed by annular recesses in the casing parts to accommodate the yoke rib elements 13.

The rib and way connections are disposed to the axis of the shaft 17 so as to afford rocking movements of the casing with respect to the yoke, and couple them for rotary movements.

Fitted to the globular external surface 23 of the casing is the concave flange 24 of a box 25 for the shaft 5 and which is desirably recessed, as shown, for a bushing 26. 27 represents a collar secured to the shaft 5, Fig. 1, by means of set screws 28 for retaining the box flange 24 in juxtaposition with the casing.

A gasket or packing ring 29 is utilized in a groove adjacent to the margin of the flange to provide a joint which will prevent the escape of grease or other lubricant from the casing.

In operation, the yoke connected by post 9 to the shaft 5 and by the rib 13 and circular way 22 to the casing, which is connected for rotation to the other shaft 17, affords universal relative movement to the shafts.

By my improved structure, ample bearing surfaces are provided between the yoke and both shaft 5 and the casing. The structure is also advantageous by the provision of a casing adapted to contain lubricating material and with means for retaining same in the casing and excluding dirt or dust.

What I claim, is—

1. A universal joint comprising a casing formed of two complementary members, banding rings engaging tapering seats provided on said members for uniting the same, a separable yoke provided in said casing and having a rib engaging in a circular way of the casing, a shaft splined to said casing, and a second shaft extending into the casing and pivotally connected to said yoke.

2. A universal joint having a two-part casing constituting one of the joint members, said parts being formed with complementary recesses to provide an annular way within the casing, means to rigidly secure said casing parts together, a shaft connected to said casing for rotary movements, a yoke enclosed by said casing and having a peripheral rib slidable in said way, said yoke comprising two heads held in spaced relations by a post; a second shaft extending into the casing and hingedly connected to said yoke, and means mounted on the second-named shaft to cover the opening thereabout in the casing.

3. A universal joint having a two-part casing constituting one of the joint members, said casing being divided on a longitudinal plane extending diametrically through the casing chamber, said parts being formed with complementary recesses to provide an annular way within the casing, means to rigidly secure said casing parts together, a shaft connected to said casing for rotary movements, a second member enclosed by said casing and having a peripheral rib slidable in said way, a second shaft extending into the casing and hingedly connected to said second member, a sleeve provided on the last-named shaft, packing means provided between said sleeve and the casing, and means engaging the referred-to shaft for maintaining said sleeve in adjusted positions with respect to the casing.

4. In a universal joint, the combination with a shaft having an apertured end, and a yoke having a post extending through the aperture of said shaft, said yoke being provided with arcuate shaped heads at opposite ends of the post and having bearing surfaces for said shaft end, of a separable casing for said yoke, means for securing the casing parts together, said casing being provided interiorly with circular bearing surfaces for said yoke, cooperating means provided for the yoke and casing to obviate any rotary motion of the latter about the axis of said shaft, and a shaft secured against independent rotary movement to said casing.

5. In a universal joint, the combination of a casing formed of two complementary members, means for coupling said casing members, a shaft secured to said casing, a yoke provided in said casing and having a rib element engaging in a circular way of the casing, said yoke comprising two heads rigidly coupled at a definite distance apart by a post, and a second shaft pivotally connected to said post and bearing against both of the yoke heads.

6. In a universal joint, two shafts, a yoke having two spaced heads, a stud extending from one of said heads, a post extending from the other head and having an aperture to receive said stud, said post serving as a journal pin for one of said shafts, a casing inclosing said yoke and connected thereto for rotary movements, said casing being rigidly connected to the other of said shafts.

Signed at Seattle, Washington, this 8th day of August, 1917.

WILLIAM O. KUHN.

Witnesses:
 PIERRE BARNES,
 E. PETERSON.